United States Patent
Goss, Jr.

[11] 3,782,054
[45] Jan. 1, 1974

[54] CORNER ANGLE FOR WINDOWS
[75] Inventor: Lorane G. Goss, Jr., Mechanicsburg, Pa.
[73] Assignee: Capitol Products Corporation, Mechanicsburg, Pa.
[22] Filed: Sept. 15, 1971
[21] Appl. No.: 181,108

[52] U.S. Cl.................52/758 H, 52/656, 403/295, 403/401
[51] Int. Cl............................................. F16d 7/04
[58] Field of Search.......... 287/189.36 H, 189.36 C, 287/189.36 F, 54 A, 54 C; 52/656, 475; 160/381

[56] References Cited
UNITED STATES PATENTS
898,751  9/1908  Krantz ...................... 287/189.36 H FOREIGN PATENTS OR APPLICATIONS
250,299  4/1946  Switzerland................ 287/189.36 H Primary Examiner—Jordan Franklin
Assistant Examiner—Wayne L. Shedd
Attorney—Donald L. Johnson et al.

[57] ABSTRACT

A one-piece, drive-in, spring steel corner or clip for joining mitered joint window frames.

3 Claims, 3 Drawing Figures

PATENTED JAN 1 1974 3,782,054

CORNER ANGLE FOR WINDOWS

BACKGROUND OF THE INVENTION

The present invention is in the general field of construction and relates specifically to window frames and especially window frames manufactured from aluminum and aluminum alloys or similar materials.

Mitered joint window frames have heretofore been joined together with a three-piece corner angle comprising a zinc die casted angle with a spring steel clip on each end thereof. The present invention provides a unique one-piece corner angle or clip which can be manufactured easily and inexpensively and which can be quickly inserted into a mitered cut aluminum frame to join a similar mitered cut aluminum frame.

SUMMARY OF THE INVENTION

The present invention comprises a single piece right angle member preferably made or constructed from spring steel. The corner angle or clip is a channel member in which one leg thereof is extended in each direction and bent towards the other leg of the channel member thereby forming a foot on each end which is adapted for ready insertion into a mitered window frame.

DESCRIPTION OF THE PREFERRED EMBODIMENT

Figure 1:
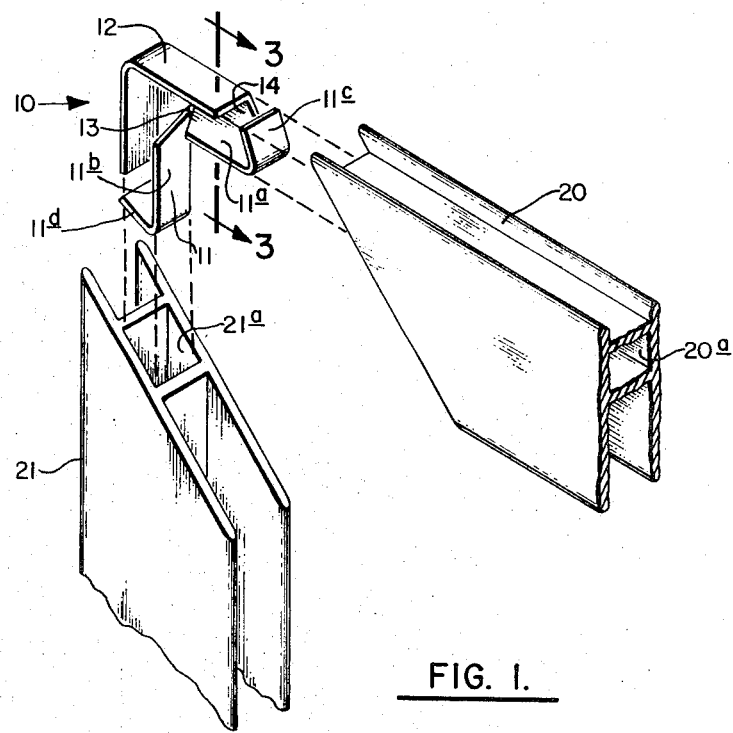
FIG. 1 is a perspective view of the unique corner angle of the present invention and also illustrates how the corner angle is positioned or inserted in mitered window frames for joining such frames together.

Referring to the drawings, the corner angle or clip of the present invention is illustrated generally at 10. As can be seen in FIG. 1, the corner angle 10 comprises a channel member in which one leg 11 is of a greater length than the opposite leg 12 of the angle member 10. The leg 11 has a cut or slot 13 therein which extends the width of the member 10 to the side 14 of the member 10. The side or web 14 connects or joins the two legs 11 and 12 together. The legs 11 and 12 are integrally formed with the web 14 and extend at substantially right angles therefrom and are substantially parallel to each other to thereby form the channel member. The corner angle 10 is bent or shaped to form a right angle. The slot 13 equally divides the leg 11 into two separate leg portions 11a and 11b. The slot 13 is preferably a V-notch or cut. The ends of the leg portions 11a and 11b are bent inwardly or towards the leg 12 of the member 10 to form feet portions or foot members 11c and 11d, respectively. The inwardly bent portion of each of the foot members 11c and 11d extends inwardly toward the shorter leg 12 and slightly therebeyond. The foot members 11c and 11d are of such a length that they extend a little beyond the leg 12 when in their normally bent position. The leg 11 is also of a greater length in each longitudinal direction than the web 14. The foot members 11c and 11d formed on each end of the leg 11 thus extend beyond the web 14 and are substantially free of both the web 14 and the shorter leg 12. The member 10 is preferably constructed of spring steel.

FIG. 1 also shows a section of mitered aluminum window frames 20 and 21 with their respective rectangular openings 20a and 21a for receiving the legs 11 and 12 of the member 10.

Figure 2:
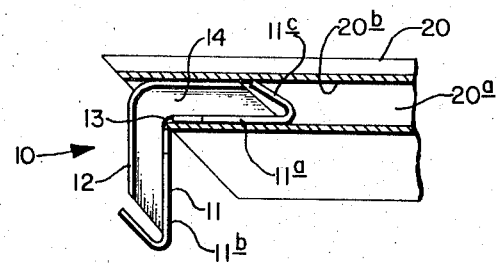
FIG. 2 is a sectional view of the corner angle of the present invention with one pair of legs thereof inserted into a mitered window frame.

As can be seen more clearly in FIG. 2, when the foot member 11c is inserted in the opening 20a of the frame 20, the foot 11c is bent further inwardly and is engaged with the upper surface 20b of the opening 20a of the window frame 20 to form a tight fit therewith. The spring force exerted by leg 11a against surface 20b of the frame holds the corners snug and by virtue of the hardness of the metal of the clip or corner angle 10, the leg penetrates into the softer metal of the frame 20 preventing withdrawal of the clip without use of a substantial force and resulting damage to the frame and/or corner angle. The leg 11a is extended into the opening 20a to the slot 13 of the angle 10 or substantially as far as it will go. The leg portion 11b and foot 11d are inserted into window frame 21 in a similar manner.

Figure 3:
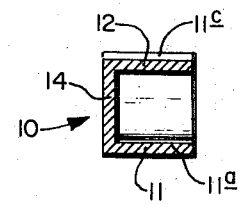
FIG. 3 is a sectional view of the corner angle of the present invention taken along line 3—3 of FIG. 1.

In FIG. 3, it can readily be seen that the legs 11 and 12 extend an equal distance from side 14 of the corner angle 10.

The unique corner angle of the present invention can be quickly and easily manufactured from a single piece of spring steel or similar suitable material and is prefabricated to a size in accordance with th openings in the mitered window frames to be joined together.

In repairing a window sash having a broken glass, the frame is twisted at the corner, which breaks the clip or corner angle. The broken halves of the corner angle are then pushed or driven further into the openings of the frame a sufficient amount to allow a new corner angle to be inserted after glazing.

The foregoing disclosure and description of the invention is illustrative and explanatory thereof and various changes in the size, shape and materials as well as in the details of the illustrated construction may be made within the scope of the appended claims without departing from the spirit of the invention.

What is claimed is:

1. An article of manufacture comprising a one-piece channel member having two legs joined together by a web, one leg thereof being of a greater length in each longitudinal direction than the other leg thereof with said longer leg having the ends thereof bent inwardly towards the shorter leg thereof whereby foot portions are formed on each end of the channel member, said foot portions extending longitudinally beyond the shorter leg and then inwardly toward and beyond the shorter leg, said longer leg also being of a greater length in each longitudinal direction than the web joining together said longer leg and said other shorter leg, and said channel member being bent at substantially a right angle whereby each end portion thereof may be inserted into an opening in a mitered window frame.

2. The article of claim 1, wherein the corner angle is made from spring steel.

3. The article of claim 1, wherein said longer leg is divided by a slot or cut therein extending to the web joining together the two legs of the channel member.

* * * * *